United States Patent
Shoda

(10) Patent No.: US 7,580,161 B2
(45) Date of Patent: Aug. 25, 2009

(54) METHOD AND APPARATUS FOR IMAGE PROCESSING

(75) Inventor: Hirokazu Shoda, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 700 days.

(21) Appl. No.: 11/079,485

(22) Filed: Mar. 15, 2005

(65) Prior Publication Data

US 2006/0209312 A1 Sep. 21, 2006

(51) Int. Cl.
H04N 1/40 (2006.01)

(52) U.S. Cl. .......................... 358/461; 382/309; 356/71

(58) Field of Classification Search ......... 358/1.1–1.15; 382/172, 176, 240, 274
See application file for complete search history.

(56) References Cited

U.S. PATENT DOCUMENTS 5,204,737 A * 4/1993 Hakkaku et al. ............. 358/500
5,651,078 A * 7/1997 Chan .......................... 382/261
5,852,677 A * 12/1998 Nakamura et al. ........... 382/173
6,151,419 A * 11/2000 Aoki .......................... 382/274
6,636,630 B1 * 10/2003 Adachi et al. ............... 382/176
2001/0015815 A1 * 8/2001 Hada et al. .................... 358/1.9
2001/0031093 A1 * 10/2001 Fujiwara et al. ............. 382/240
2004/0100667 A1 * 5/2004 Oyama et al. ............... 358/484

FOREIGN PATENT DOCUMENTS

JP 11-41428 A 2/1999

OTHER PUBLICATIONS

U.S. Appl. No. 10/968,284, filed Oct. 20, 2004, Shoda et al.
U.S. Appl. No. 10/790,009, filed Mar. 02, 2004, Misaka et al.
U.S. Appl. No. 12/164,712, filed Jun. 30, 2008, Koji et al.

* cited by examiner

Primary Examiner—Mark K Zimmerman
Assistant Examiner—Dung D Tran
(74) Attorney, Agent, or Firm—Foley & Lardner LLP

(57) ABSTRACT

The invention relates to an apparatus and method for image processing, which can prevent saturation of a high-density image to read the image in which gradation skip is not generated in reading information on a document. Image density is detected based on an image signal, and sensitivity characteristics of the image signal is switched based on the detected result.

2 Claims, 11 Drawing Sheets

→ Image data
----→ Density determination signal

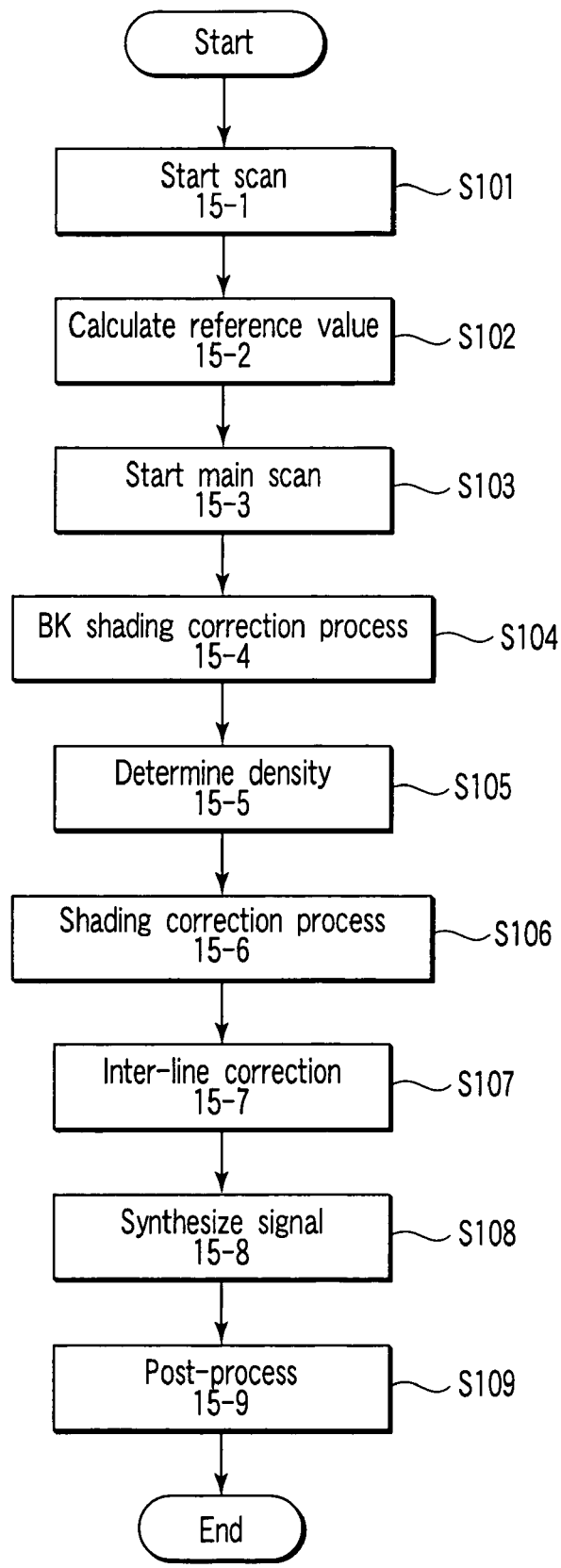
F I G. 15

METHOD AND APPARATUS FOR IMAGE PROCESSING

BACKGROUND OF THE INVENTION

1. Field of the Invention

The present invention relates to an image reading apparatus for reading an image output from an image forming apparatus such as an electrophotographic apparatus and a laser printer, and an image processing method for processing the image read by the image reading apparatus.

2. Description of the Related Art

Jpn. Pat. Appln. KOKAI Publication No. 11-41428 proposes an apparatus and method for image reading, in which a saturated exposure amount is enhanced by adding output signals of plural photoelectric conversion pixel columns which have substantially the same saturated electric charge amount and are set at different levels in sensitivity.

In the apparatus and method for image reading disclosed in the publication, it is described that a dynamic range which can be utilized for the image reading can be expanded by adding the outputs of the photoelectric conversion pixels having the different levels in sensitivity.

However, in the image reading apparatus described in the publication, two kinds of photoelectric conversion elements are necessary to read one signal. Therefore, when the technology described in the publication is applied to a CCD sensor which reads each of the colors R, G, and B, the photoelectric conversion elements of six lines are required.

Thus, because the number of signal lines required for the outputs of the signals from the CCD sensor is increased, there is a problem in that cost is increased.

Since the six-channel signals are output from the CCD sensor, the same number of elements for pre-processes such as analog-to-digital conversion is also required, which results in the problem the cost is further increased.

BRIEF SUMMARY OF THE INVENTION

An object of the invention is to prove an image reading apparatus and an image processing method, which can prevent saturation of a high-density image to read the image in which gradation skip is not generated in reading information on a document.

The invention provides an image processing device comprising: density detecting means for detecting image density based on an image signal read by an image reading apparatus; switching signal generating means for switching sensitivity characteristics of the signal output from the image reading apparatus based on the result detected by the density detecting means; and sensitivity switching means for switching the sensitivity characteristics of the signal output from the image reading apparatus based on the result determined by the density detecting means.

Further, the invention provides an image processing device comprising: density detecting means for detecting image density based on an image signal read by an image reading apparatus; switching signal generating means for switching sensitivity characteristics of the signal output from the image reading apparatus based on the result detected by the density detecting means; and shading correction means for performing shading correction to each of the output signals having different sensitivity characteristics from the image reading apparatus, the shading correction means having different pieces of white reference data corresponding to different sensitivity characteristics.

Still further, the invention provides an image processing device comprising: first reading means having first reading characteristics; second reading means having second reading characteristics different from the first reading characteristics; and density detecting means for detecting image density based on an image signal read by the second reading means; switching means for switching sensitivity characteristics of the first reading means based on the result detected by the density detecting means.

Furthermore, the invention provides an image processing method comprising: reading image signals output from a photoelectric conversion element, in which pixel columns of at least three lines are linearly arranged, based on exposure amount×constant and n×exposure amount×constant; using a signal of exposure amount×constant to determine that the image signal is high density when a signal value of exposure amount×constant is lower than th_H; using the signal of exposure amount×constant to determine that the image signal is low density when the signal value of exposure amount×constant is not lower than th_H; and selecting the image read by any one of exposure amount×constant and n×exposure amount×constant based on determination result.

Moreover, the invention provides an image processing method comprising: reading image signals by a photoelectric conversion element in which pixel columns of at least three lines are linearly arranged; using output from pixel columns linearly arranged independently of the pixel columns of three lines to determine that the image signal is high density when a output value from the pixel columns linearly arranged independently is lower than th_H; using output from pixel columns linearly arranged independently of the pixel columns of three lines to determine that the image signal is low density when the output value from the pixel columns linearly arranged independently is not lower than th_H; and selecting the image read by any one of exposure amount×constant and n×exposure amount×constant using an area where the pixel columns of three lines are linearly arranged based on determination result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 15 is a flowchart showing an image processing routine performed by the image processing unit shown in FIG. 14.

DETAILED DESCRIPTION OF THE INVENTION

Figure 1:
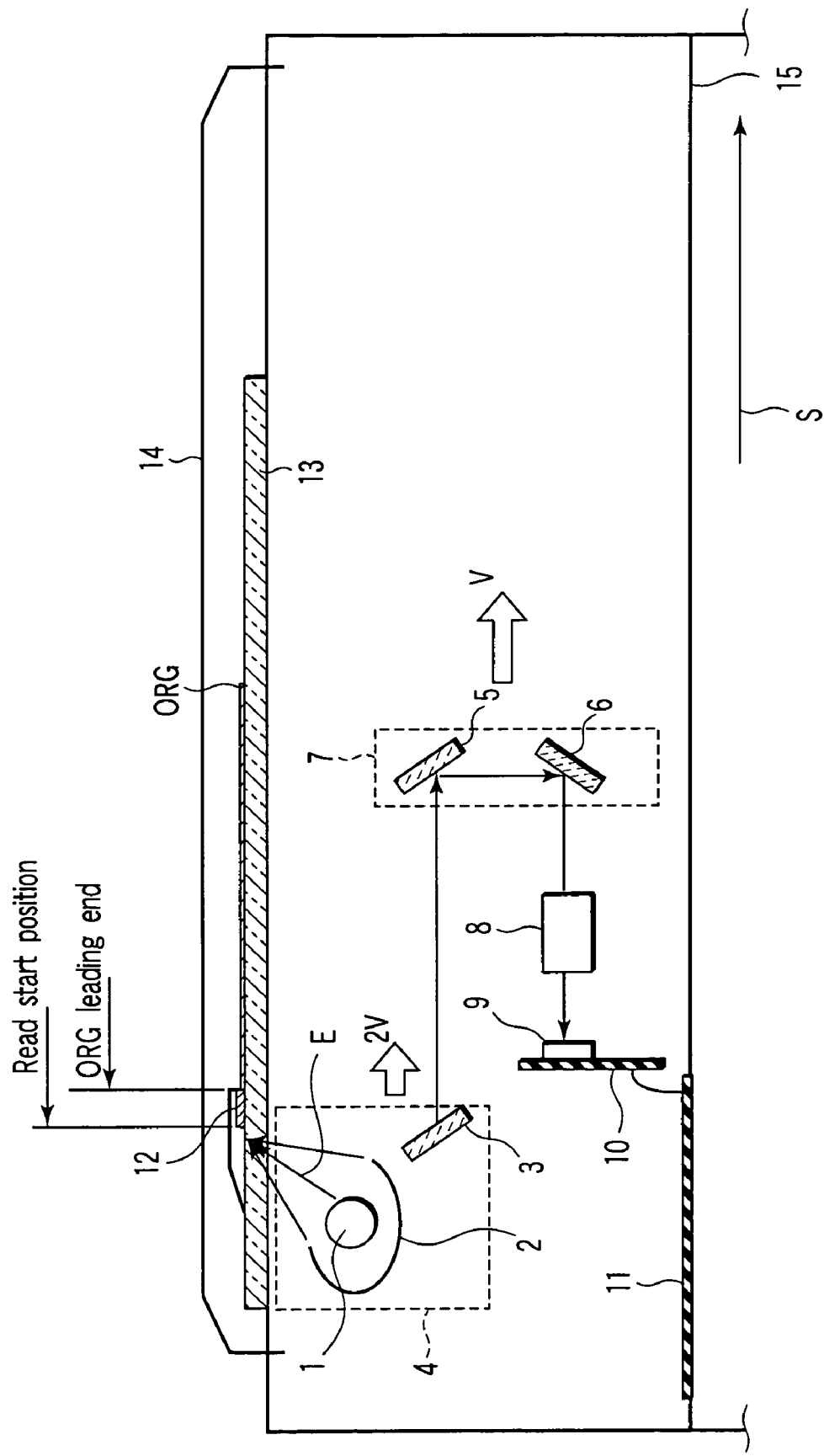
FIG. 1 is a schematic view for explaining an example of an image reading apparatus to which an embodiment of the invention is applied.

Referring now to the drawings, embodiments of the invention will be described.

FIG. 1 shows an image reading apparatus according to an embodiment of the invention and an image processing device incorporated into the image reading apparatus.

As shown in FIG. 1, the image reading apparatus (scanner) has a predetermined length in a direction orthogonal to an arrow S to include a lamp (light source) 1 which emits light having a predetermined wavelength distribution (color). The light source 1, a reflector 2, and a first mirror 3 are held by a first carriage 4 which is moved in the direction of the arrow S. The reflector 2 is used to correct light distribution characteristics in a longitudinal direction of the light source 1, of the light emitted from the light source 1, and to condense the light in a predetermined direction (direction of arrow E).

A second mirror 5 which bends the light reflected from the first mirror 3 at right angles, and a third mirror 6 which further bends the light incident from the second mirror 5 at right angles are provided in the direction (direction of arrow S) in which the light reflected from the first mirror 3 held by the first carriage 4 is guided. The second mirror 5 and the third mirror 6 are held by a second carriage 7 which is moved in the direction of the arrow S in association with the first carriage 4.

The image of the light reflected from the third mirror 6 is formed onto a light reception surface of a CCD sensor 9 by a condenser lens (magnification setting lens) 8. The CCD sensor 9 is fixed at a predetermined position of a chassis 15 through a drive circuit board (CCD sensor board) 10. Sensor output output from the CCD sensor board 10 is supplied to a signal processing board 11.

The illuminating light from the light source 1 and the reflector 2 are condensed on a white reference plate 12 and a document glass 13 provided at predetermined positions on the chassis 15.

A reading object having image information to be read, i.e., an original ORG is set on the document glass 13. The original ORG can have an arbitrary shape and thickness which are represented by, for example, a sheet-like medium, a book, and a solid. The original ORG is brought into close contact with the document glass 13 by a document presser (cover) 14.

The light, i.e., lighting from the light source 1 and the reflector 2 is focused in a predetermined direction around the arrow E, and the original ORG supported by the document glass 13 is irradiated with the light. Needless to say, the light can be transmitted through the document glass 13. Because the light distribution of the light emitted from the light source 1 is not even in the total length in the longitudinal direction of the light source 1, it is known that the light includes unevenness of illuminance in the longitudinal direction when the original ORG is irradiated. Therefore, the light distribution can be even on the original ORG by irradiating the original ORG with the light reflected from the reflector 2 at the same time.

The light reflected from the original ORG is reflected in the order of the first mirror 3, the second mirror 5, and the third mirror 6. Then, the image of the light is formed on the light-reception surface of the CCD sensor (line sensor) 9 through the condenser lens 8. For example, the CCD sensor 9 is a three-line CCD sensor in which the line sensor corresponding to each R, G, and B of three primary colors for use in additive color mixture is independently provided.

The light incident to the CCD sensor 9 is converted into an electric signal having a magnitude corresponding to light intensity by the CCD sensor board 10, and the electric signal is supplied to the control board 11. The CCD sensor board 10 holds the CCD sensor 9. The CCD sensor board 10 also includes at least a CCD sensor control circuit 10A which drives the CCD sensor 9 and a CCD driver 10B which receives directions (drive control signals) from the CCD sensor control circuit 10A to adjust drive conditions of the CCD sensor 9.

Figure 2:
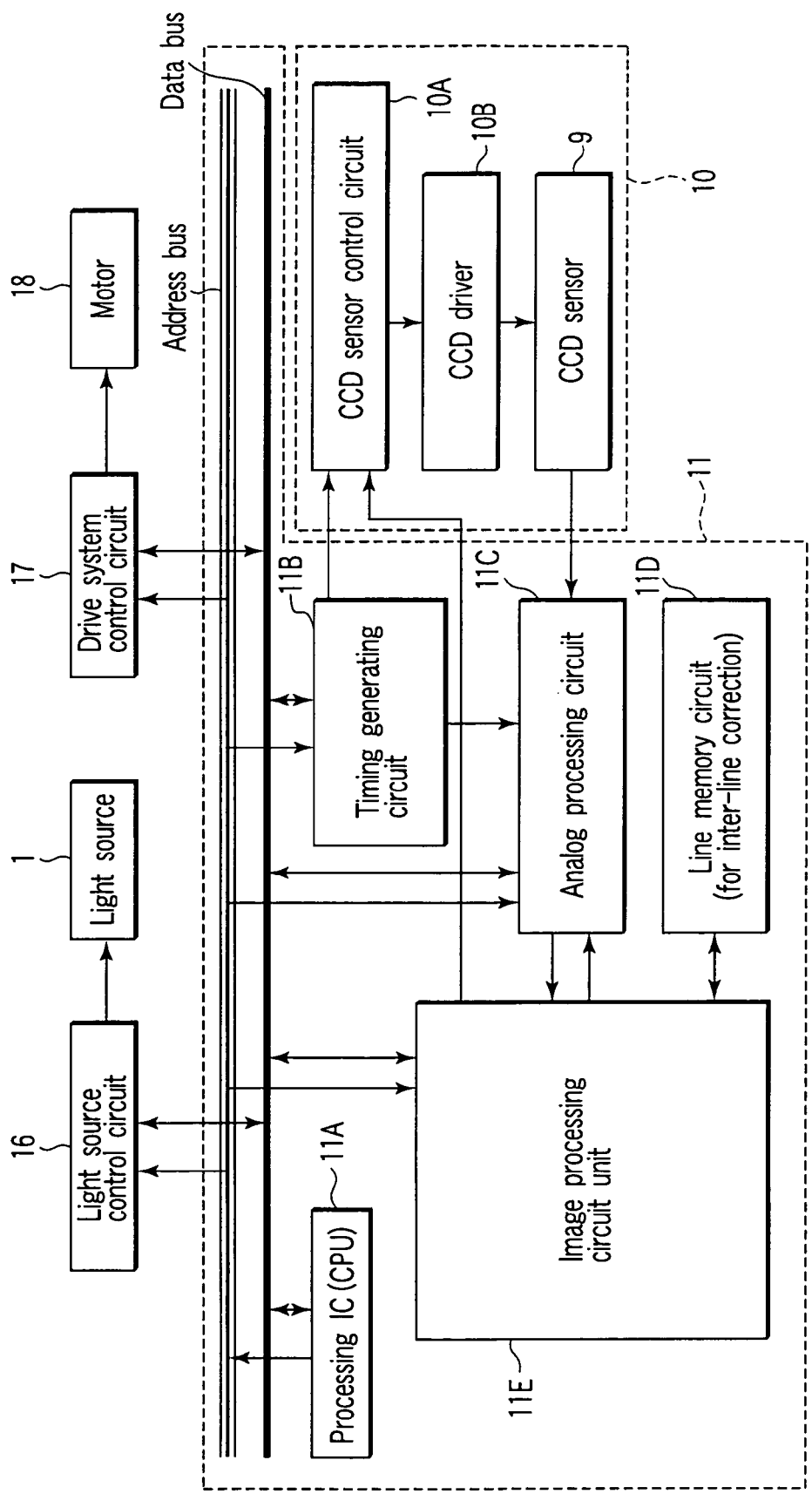
FIG. 2 is a block diagram for explaining an example of an image processing device incorporated into the image reading apparatus shown in FIG. 1.

FIG. 2 shows an example of an image processing board.

The control board 11 includes: a processing IC (CPU) 11A which processes the photoelectric conversion output output from the CCD sensor 9 according to a predetermined rule; a timing generation circuit 11B which generates various kinds of timing required for each action (process); an analog processing circuit 11C which converts R, G, and B analog signals from the CCD sensor 9 into digital signals; an image processing circuit unit 11E which performs image correction such as shading correction for correcting high-frequency and low-frequency distortions which are included in the digital signal output from the analog processing circuit 11C and/or inter-line correction for correcting line position shift among the R, G, and B line sensors; and a line memory circuit 11D which delays image data in unit of line during the inter-line correction.

The timing generation circuit 11B and the image processing circuit unit 11E are connected to the CCD sensor control circuit 10A mounted on the CCD sensor board 10. In addition to the CCD sensor 9 and the CCD sensor control circuit 10A, the CCD driver 10B is provided on the CCD sensor board 10.

As described below referring to FIG. 3, the CCD sensor 9 can output the output signal in either a low-sensitivity characteristics gain or a high-sensitivity characteristics gain. The analog signal output from the CCD sensor 9 generally includes high-frequency distortion and low-frequency distortion. The high-frequency distortion is caused by variations in conversion efficiency of the respective photoelectric conversion elements. The image light includes aberration caused by the image-formation through a reducing optical system with the condenser lens 8, which results in the low-frequency distortion. Accordingly, normalization correction and reference data used for the normalization correction are required. The reference data is intensity of the light reflected from the white reference plate 12, i.e., image data when taking the white reference plate 12.

The image processing circuit unit 11E outputs a gain switching signal for switching sensitivity of the CCD sensor 9 to the CCD sensor control circuit 10A and the analog processing circuit 11C. As shown in FIG. 3, the gain switching signal can set the signal output from the CCD sensor 9 to either low-sensitivity characteristics or high-sensitivity characteristics. The generation of the gain switching signal and the shading correction process are described later.

Figure 3:
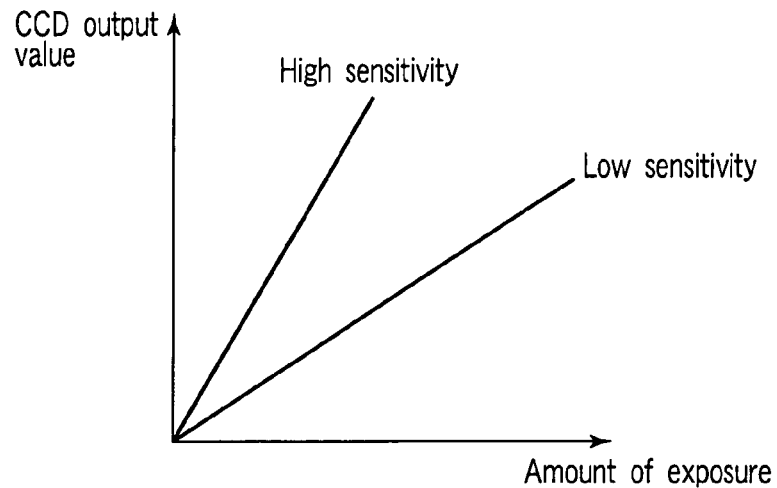
FIG. 3 is a graph showing a relationship between output characteristics and gains in a CCD sensor.

The low-sensitivity and high-sensitivity output characteristics shown in FIG. 3 are the sensitivity characteristics shown in the following equations:

Low-sensitivity characteristics;

$$CCD \text{ output value} = \alpha \times \text{exposure amount}$$

High-sensitivity characteristics;

$$CCD \text{ output value} = n \times \alpha \times \text{exposure amount} = n \times \text{low-sensitivity CCD}$$

output value, where n is an integer (n=2 in the embodiment).

The processing IC 11A controls actions (signal processing) of the CCD sensor control circuit 10A of the CCD sensor board 10, a light source control circuit 16, and/or a drive system control circuit 17. The light source control circuit 16 controls a quantity of light output from the light source 1, and the light source control circuit 16 also controls turn-on and turn-off of the light source 1. The drive system control circuit 17 controls a motor 18 which moves the first carriage 4 and the second carriage 7. For example, the motor 18 moves the second carriage 7 at speed V in the direction of the arrow S when the document image is read. At this point, the first carriage 4 is moved at speed 2V in the direction of the arrow S.

The CCD sensor board 10 includes the CCD line sensor 9, the CCD sensor control circuit 10A which drives the CCD line sensor 9, and the CCD driver 10B which receives the output from the CCD sensor control circuit 10A to adjust drive conditions of the CCD line sensor 9.

Figure 4:
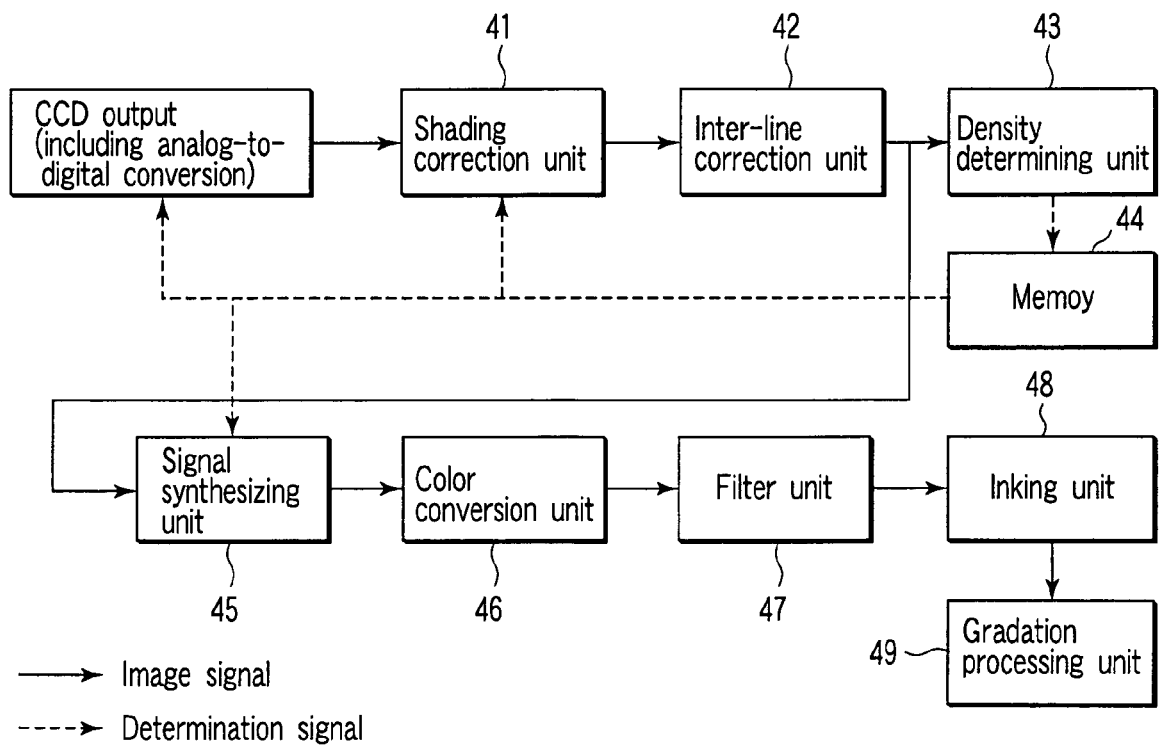
FIG. 4 is a block diagram for explaining an example of an image processing unit applicable to the image processing device shown in FIG. 2.

FIG. 4 shows a configuration of the image processing circuit unit 11E.

The image processing circuit unit 11E includes a shading correction unit 41, an inter-line correction unit 42, an image density determining unit 43, a memory 44, a signal synthesizing unit 45, a color conversion unit 46, a filter unit 47, an inking unit 48, and a gradation processing unit 49.

The shading correction unit 41 corrects the high-frequency and low-frequency distortions which are included in the digital signal output from the analog processing circuit 11C (shading correction is performed).

In the image signal to which the shading correction is performed, the inter-line correction unit 42 corrects physical position shift of the output signal corresponding to each of R, G, and B (the inter-line correction unit 42 performs the physical position shift correction, i.e., "inter-line correction" to the output from each line sensor (R, G, and B)).

For image data in which the physical position shift from each line sensor is corrected by the inter-line correction unit 42, the image density determining unit 43 determines whether or not each piece of the image data has the high density by comparing each piece of the image data to a particular threshold (namely, whether or not the image data has the low density). For example, the image density determining unit 43 outputs a determination signal having one bit (0: low density/ 1: high density).

The density determining unit 43 determines the density and outputs the determination signal. Then, the determination signal is stored in the memory 44. The determination signal stored in the memory 44 is supplied to the shading correction unit 41, the signal synthesizing unit 45, the CCD sensor control circuit 10A, and the analog processing circuit 11C at predetermined timing (on demand). Thus, the sensitivity can be switched in each pixel (light-reception cell of CCD sensor) base on the determination signal by generating the determination signal to store the determination signal in the memory 44.

The signal synthesizing unit 45 synthesizes the low-sensitivity characteristics signal and the high-sensitivity characteristics signal.

The output signals (R, G, and B signals) whose sensitivity is set in each pixel synthesized by the signal synthesizing unit 45 are input to the color conversion unit 46. The color conversion unit 46 converts the R, G, and B signals into C, M, and Y signals (the color conversion unit 46 performs color conversion of the R, G, and B signals into the C, M, and Y signals). The C, M, and Y signals are utilized, when the output image is output by subtractive color mixture to an output medium such as sheet paper and transparent resin film.

The signals output from the color conversion unit 46 are input to the filter unit 47, and a low-pass filter process and a high-pass filter process are performed to the signals.

The C, M, and Y signals output from the filter unit 47 are converted into C, M, Y, and K (bk, i.e., black) signals by the inking unit 48.

The signals output from the inking unit 48 are input to the gradation processing unit 49. A screen is generated by, e.g., a dither method, and the screen is output to an image forming unit (engine; not shown).

Figure 5A:
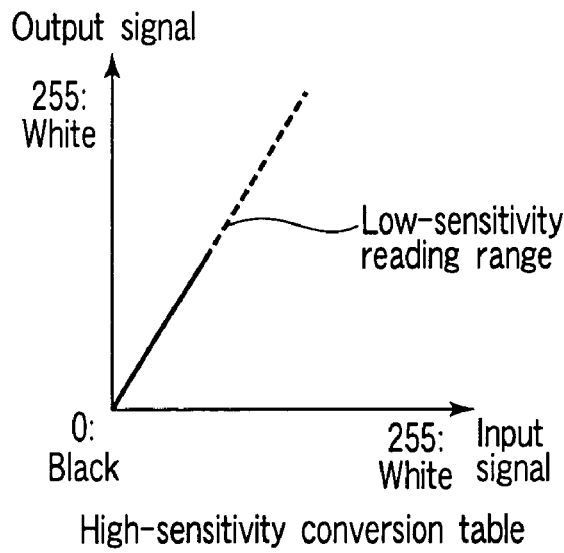
FIGS. 5A and 5B are schematic views each showing an example of a conversion table for synthesizing a high-sensitivity signal and a low-sensitivity signal, which are used in the image processing unit shown in FIG. 4.
Figure 5B:
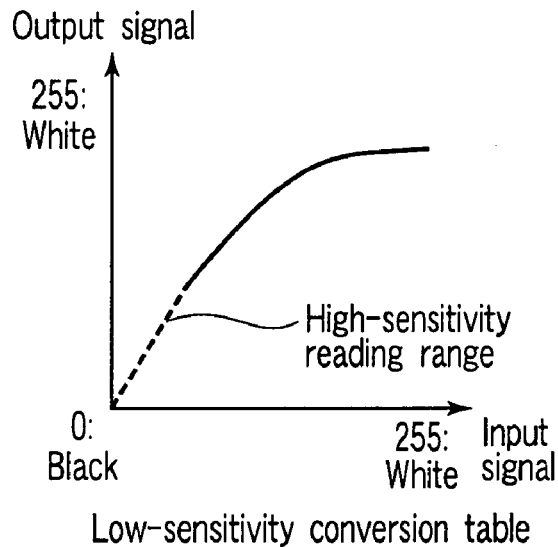

FIGS. 5A and 5B show conversion table characteristics of the signal synthesizing unit shown in FIG. 4.

FIG. 5A is the conversion table in which high-density gradation characteristics are emphasized. The reason why the high-density gradation characteristics are emphasized is that high-density resolution is excellent in human visual sense.

For the human visual sense, while the high-density resolution is excellent, the resolution is decreased in the low density. Therefore, as shown in FIG. 5B, a signal range is compressed for the low density (conversion is performed while the signal range is compressed).

Figure 6:
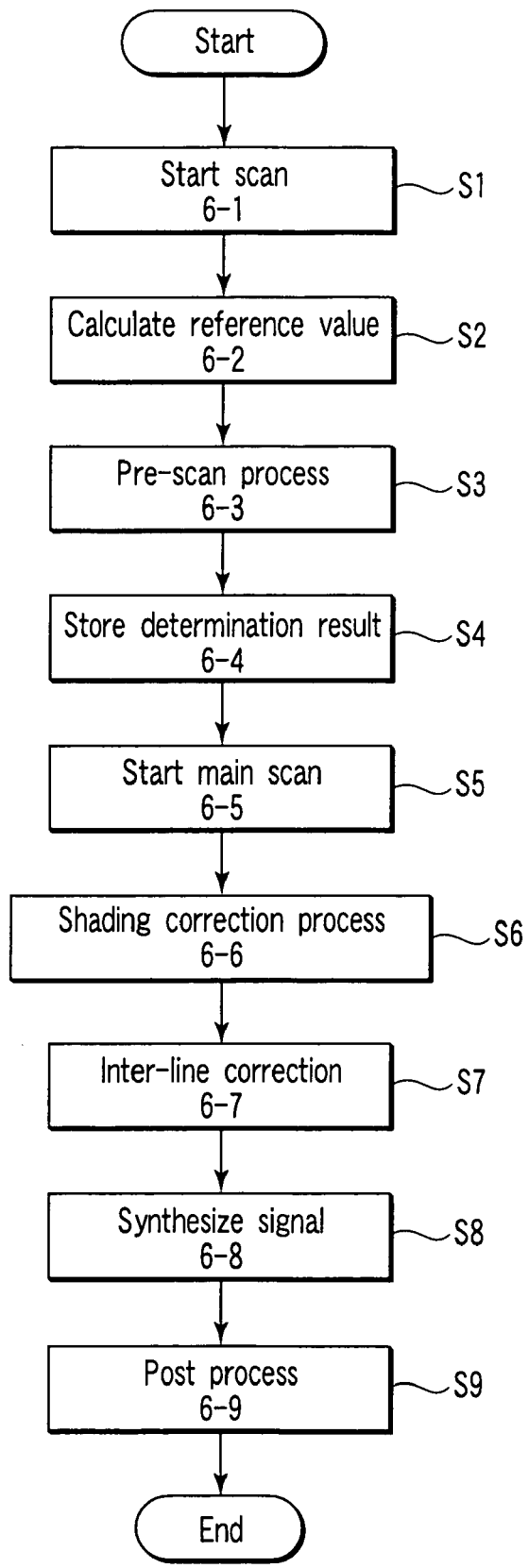
FIG. 6 is a flowchart showing an example of an image processing routine performed by the image processing unit shown in FIG. 4.

FIG. 6 shows a flowchart of reading action.

When a scan start signal <6-1> is received (S1), reference value computation <6-2> for computing the white reference value/black reference value necessary for the shading correction.

Namely, when the scan start signal <6-1> is supplied in Step S1, the white reference and black reference values are computed based on the light reflected from the white reference plate 12 (S2). At this point, the gain switching signal is output as the low-sensitivity characteristics setting value during reading the white reference plate 12. The white reference data during the high-sensitivity reading is produced by the read white reference data.

A ratio of the high sensitivity to the low sensitivity is set at, e.g., 2, and the white reference data for the high sensitivity is computed by the following equation:

High-sensitivity white reference data=2×low-sensitivity white reference data

The read white reference data and the computed white reference data are stored in the memory 44 and utilized for the shading correction data during the document scan.

On the other hand, for the black reference data, when the gain of the CCO sensor 9 is switched to the low sensitivity, i.e., when the CCO sensor 9 is in the low-sensitivity gain setting state, the light source (lamp) 1 is turned off, and the output is set to the read value. When the lamp 1 is turned off, the light is not incident to the CCO sensor 9, and therefore, the same data is utilized for the high-sensitivity black reference data.

After the shading reference data is computed in Step S2, pre-scan action for detecting a density range of the document (density-range detection action) <6-3> is performed. Namely, the pre-scan <6-3> is started in Step S3 at the time when the high-sensitivity black reference data is computed in Step S2. Even in Step S3, the gain of the CCD sensor 9 is set at the low sensitivity.

The image data read by the pre-scan action in Step S3 is input to the image density determining unit 43, and the density determination is performed in each pixel (S4). Namely, in Step S4, it is determined whether the density of the image data read by the pre-scan (S3) is "high sensitivity (1)" or "low sensitivity (0)."

In more detail, the determination is performed to image data (DATA) read at the low-sensitivity gain setting by the following conditions:

Condition 1: if DATA<th_H, high sensitivity determination ("1" is output), and

Figure 7:
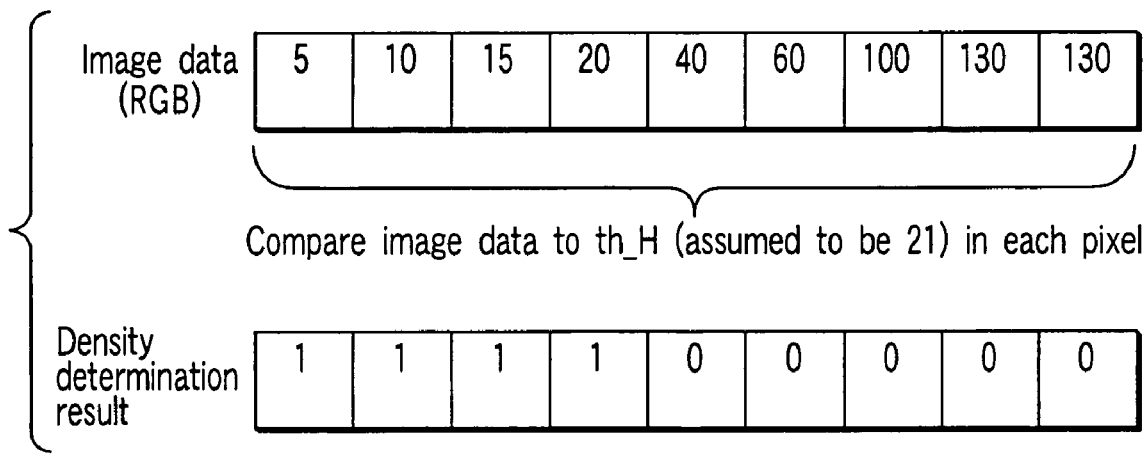
FIG. 7 is a schematic view for explaining a concept of distinguishing between high density and low density of each pixel in the image processing routine shown in FIGS. 4 and 6.

Condition 2: if DATA≧th_H, low sensitivity determination ("0" is output), where, th_H is threshold compared to the image data th_H=21 in FIG. 7), and th_H is determined based on sensitivity characteristics of CCD.

Thus, as shown in FIG. 7, the signal for switching the gain of the CCD sensor 9 can be generated in each pixel by comparing the density of the image data to the reference density.

The result determined in Step S3 (density determination result) is stored in the memory 44 in determination result storage <6-4> (S4).

After each pixel density is determined in the entire range in the main scan direction of the CCD sensor 9 and the result is stored in the memory 44, the real scan (image reading) is started in real scan start <6-5> to read the image data (S5). Namely, in Step S5, the real scan is started to read the image information on the original ORG as light and dark (intensity).

The image data read in Step S5 is compared to the density determination result already stored in the memory 44, and the gain of the output of the CCD sensor 9 is switched in each pixel (S6). Namely, the image data read by each pixel in the CCD sensor 9 is output at the corresponding output gain by switching the gain of the CCD sensor based on the density determination result read from the memory 44 in synchronization with an image reading synchronous signal.

Figure 8:
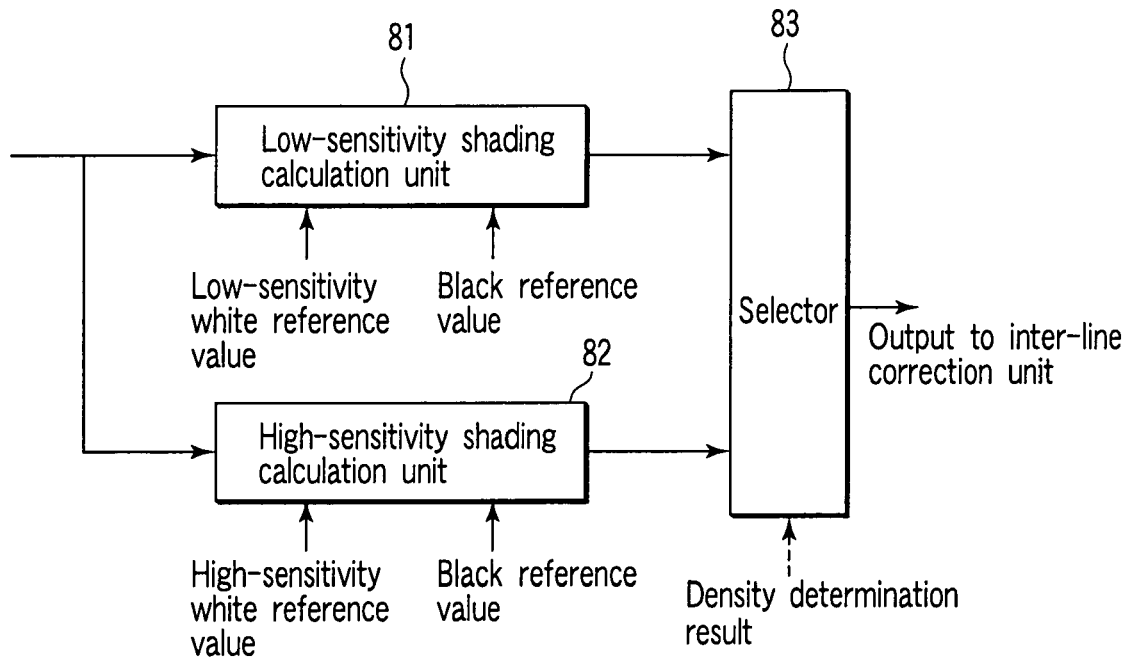
FIG. 8 is a block diagram showing an example of a configuration of a shading correction unit which is used in the image processing unit shown in FIG. 4.

Then, the shading correction is performed to the image data which is output at high sensitivity/low sensitivity from each pixel of the CCD sensor 9 in shading correction process <6-6> shown in FIG. 5 (the shading correction is performed to the image data which is output at high sensitivity/low sensitivity from each pixel of the CCD sensor 9 through the shading correction unit shown in FIG. 8, S6).

As shown in FIG. 8, the shading correction unit (the numeral 41 in FIG. 4) includes a low-sensitivity shading computation unit 81, a high-sensitivity shading computation unit 82, and a selector 83.

Each of the shading computations is processed by the following equations.

<Low-sensitivity Shading Computation>

DLout=(DLin−black reference value)/(white reference value for low sensitivity−black reference value)

<High-sensitivity Shading Computation>

DHout=(DHin−black reference value)/(white reference value for high sensitivity−black reference value)

where DLin and DHin are output values of each pixel at low-sensitivity and high-sensitivity gain settings respectively, and DLout and DHout are low-sensitivity and high-sensitivity computing results respectively.

The selector 83 switches the output value of the shading computation according to the density determination result. Accordingly, both the low-sensitivity and high-sensitivity outputs are corrected according to the sensitivity.

The image data to which the shading correction is performed in Step S6 is subjected to inter-line correction <6-7>, in which correction is performed to the mutual position shift between the line sensors corresponding to R, G, and B in the CCD sensor 9 (S7).

Specifically, among the R, G, and B line sensors in the CCD sensor 9, for example, in the case where the CCD sensor 9 has four lines (pixels) in the main scan direction of each signal, the Red signals (R sensor output) of eight lines are stored in the line memory circuit 11D (see FIG. 2) and the Green signals (G sensor output) of four lines are stored in the line memory circuit 11D. The Red signals and Green signals stored in the line memory circuit 11D are read from the line memory circuit 11D in synchronization with the output of the Blue signal (B sensor output), which allows the position shift to be corrected among the lines (pixels) in the main scan direction. Namely, the position shift can be corrected by simultaneously reading the Red signal before eight lines and the Green signal before four lines with respect to an arbitrary G signal.

The image data in which the position shift is corrected in Step S7 is synthesized in signal synthesizing <6-8> by the following process according to the low-sensitivity/high-sensitivity CCD sensor outputs and the density determination result. As described above referring to FIG. 4, the low-sensitivity/high-sensitivity CCD sensor outputs and the density determination result are input to the signal synthesizing unit 45.

Figure 9:
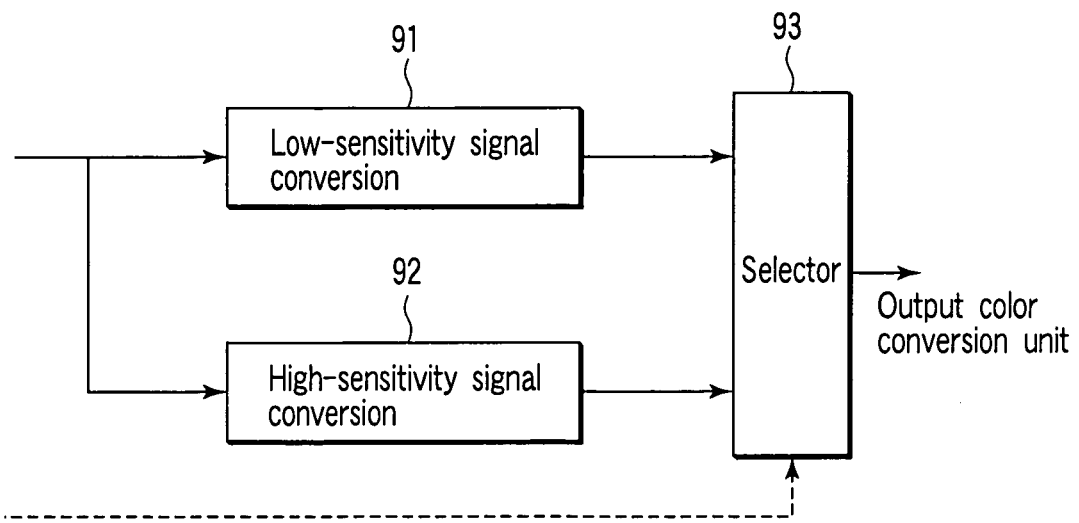
FIG. 9 is a block diagram showing an example of a configuration of a signal synthesizing unit which is used in the image processing unit shown in FIG. 4.

As shown in FIG. 9, the signal synthesizing unit includes a low-sensitivity CCD output signal conversion unit 91, a high-sensitivity CCD output signal conversion unit 92, and a selector 93. The selector 93 selectively outputs any one of the output signals from the low-sensitivity CCD output signal conversion unit 91 and the high-sensitivity CCD output signal conversion unit 92 according to the density determination result stored in the memory 44.

As shown in the white reference computation for the shading, the relationship between the low-sensitivity signal and the high-sensitivity signal, which are input to the signal synthesizing unit 45, is shown by the following equation;

high-sensitivity CCD output=*n* (*n*=2 in the previous example)×low-sensitivity CCD output (*n* is sensitivity ratio).

Accordingly, a relationship between the high-sensitivity CCD output and the low-sensitivity CCD output can be computed (associate, i.e., synthesized) by setting the determination threshold of the image density determining unit 43 according to predetermined conditions.

Figure 10:
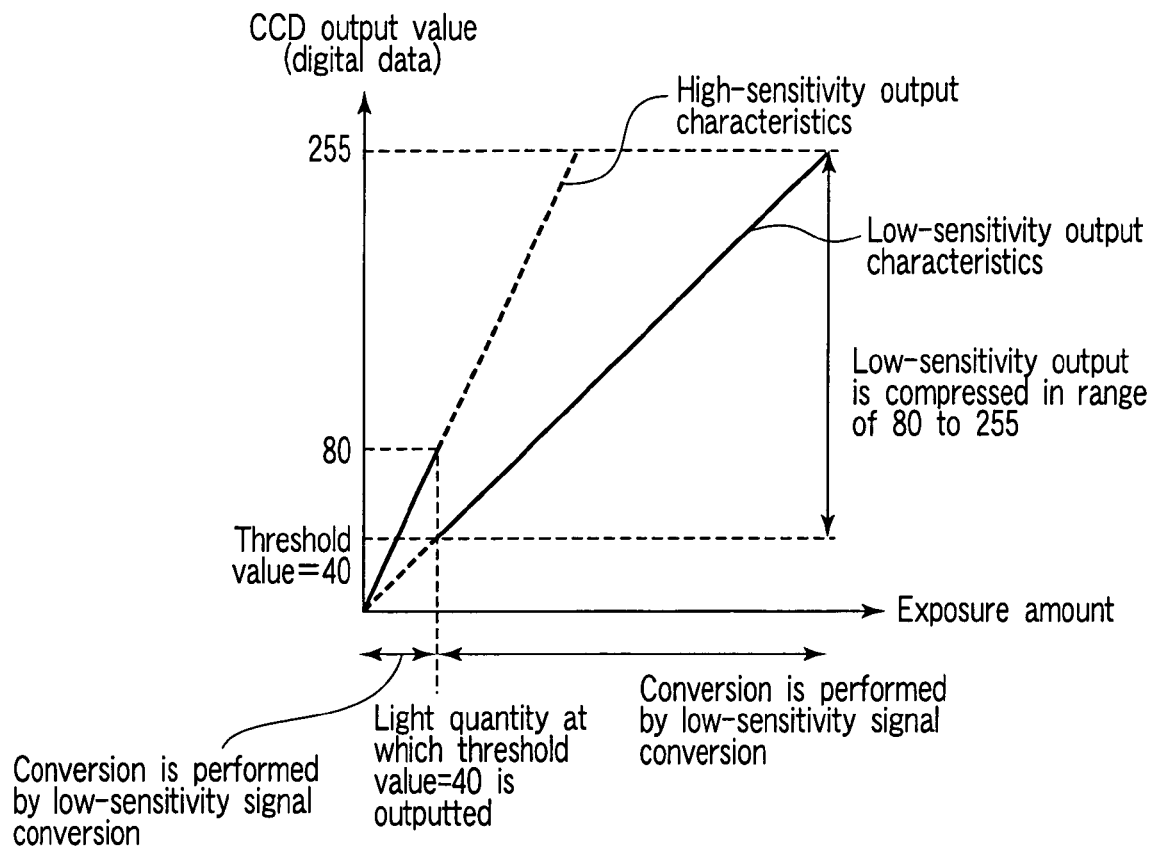
FIG. 10 is a schematic view for explaining a concept of the signal synthesizing unit in the image processing unit shown in FIG. 4.

Specifically, in the case where threshold of the density determination is set at 40 and n=2, the signal having the relationship shown in FIG. 10 is output.

In each signal conversion unit, the low-sensitivity CCD output and the high-sensitivity CCD output are converted and output by the following equations.

<Low-sensitivity Signal Conversion>

Dout=Table_L [DinrL]

where Table_L: low-sensitivity conversion table (FIG. 5), and

Din_L: low-sensitivity CCD output signal (maximum value in the case of 8 bits=40 to 255)

<High-sensitivity Signal Conversion>

Dout=Table_H [Din_H]

where Table_H: low-sensitivity conversion table (FIG. 5), and

Din_H: low-sensitivity CCD output signal (0 to 80).

The high-sensitivity signal or the low-sensitivity signal are converted according to the above equations, either the high-sensitivity signal or the low-sensitivity signal is selected by the selector 93 based on the determination result by the image density determining unit 43, and any of the signal selected by the selector 93 is output to the color conversion unit 46 (see FIG. 4).

The high-sensitivity signal or the low-sensitivity signal is input to the color conversion unit 46, and the color conversion is performed, i.e., the R, G, and B signals are converted into the C, M, and Y signals. Then, the filtering is performed to the C, M, and Y signals by the filter unit 47, and the C, M, and Y signals are converted into the C, M, Y, and K (bk, i.e., Black) signals by the inking unit 48.

The signals output from the inking unit 48 are input to the gradation processing unit 49. The screen is generated by, e.g., the dither method, and the screen is output to the image forming device (engine; not shown).

As described above, the low-sensitivity CCD sensor output and the high-sensitivity CCD sensor output are output by switching the gain in each pixel according to the density determination result based on the image density read from the document image, which allows the low-sensitivity CCD output and the high-sensitivity CCD output to be obtained from the single CCD sensor. Accordingly, the good image quality can be obtained with no gradation skip.

Since the density determination is performed during the pre-scan action, it is not necessary to have two kinds of CCD sensors of the high-sensitivity line sensor and the low-sensitivity line sensor. Therefore, the cost reduction can be achieved.

In the above-described embodiment, the sensitivity ratio of the low sensitivity to the high sensitivity is set at an integer (n). However, it is also possible that the sensitivity ratio is set at a real number (the sensitivity ratio is not always set at an integer).

In the above-described embodiment, the gradation reproducibility of the dark portion is improved. However, it is also possible that the reproducibility of the light portion is improved.

Figure 11:
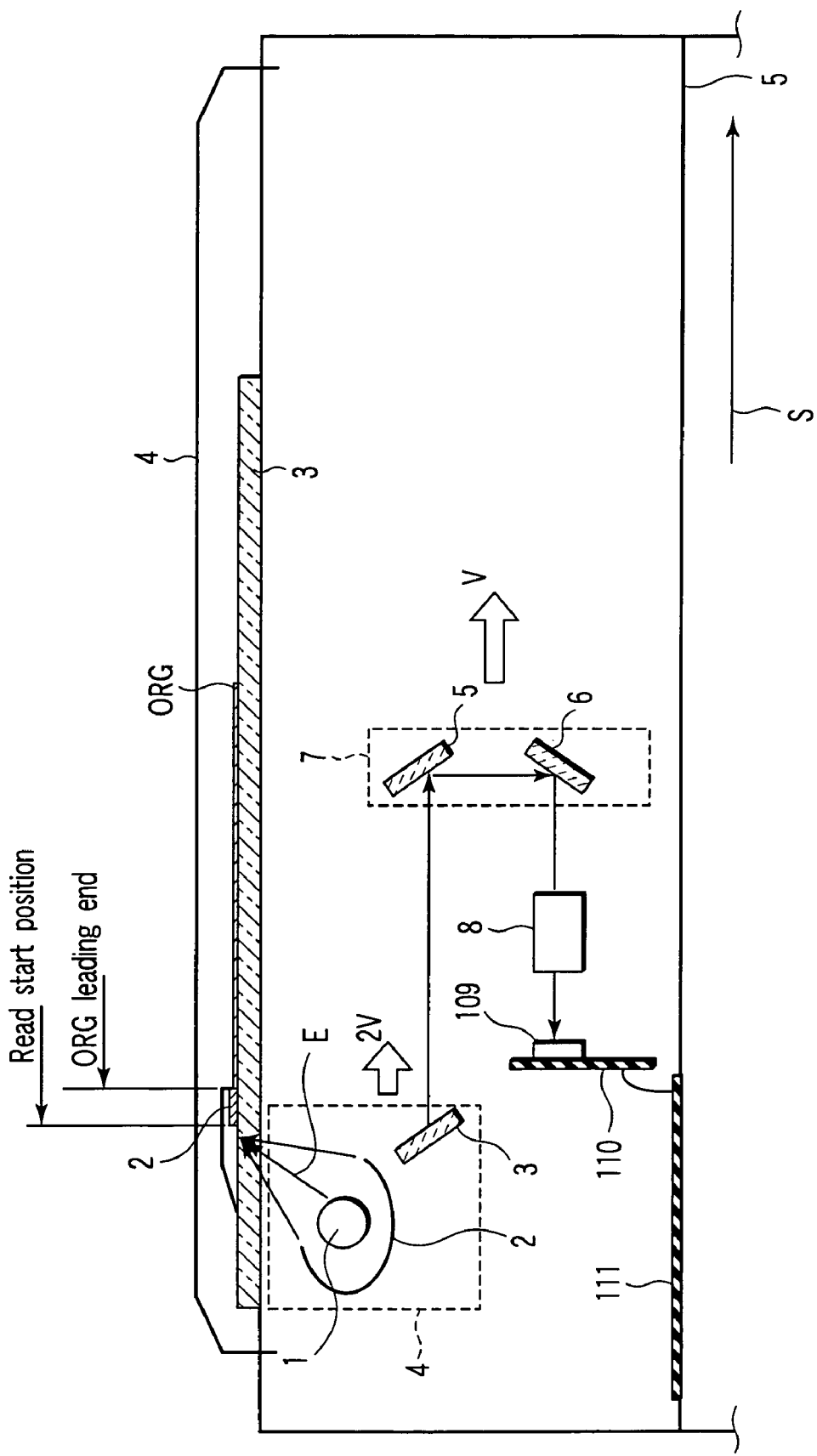
FIG. 11 is a schematic view for explaining another example of an image reading apparatus to which an embodiment of the invention is applied.

FIG. 11 shows another embodiment of an image reading apparatus and an image processing device applied to the image reading apparatus shown in FIG. 1. In FIG. 11, the same constituent as for FIG. 1 is indicated by the same reference numeral, and the description is not being repeated here.

In the image reading apparatus shown in FIG. 11, the CCD sensor 9 shown in FIG. 1 is replaced with a four-line CCD sensor 109, and a CCD sensor board 110 and a signal processing board 111 are provided for the CCD sensor 109.

Figure 12:
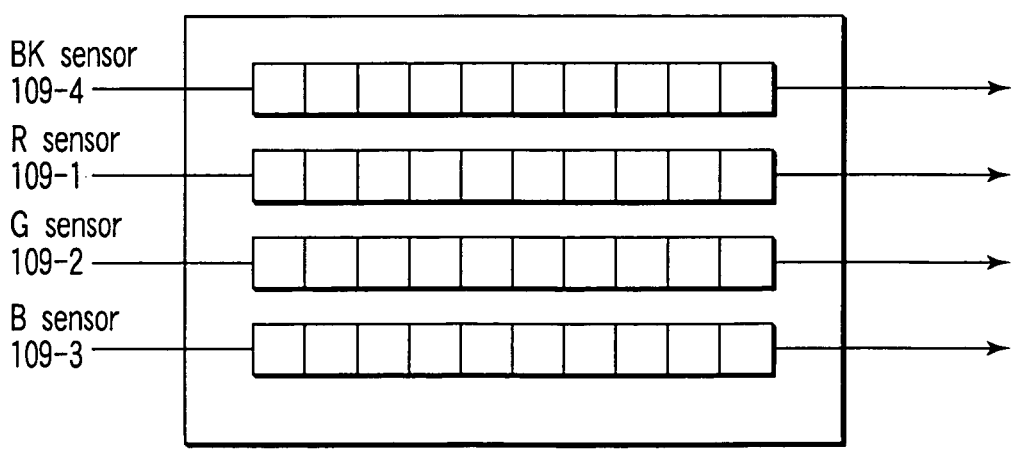
FIG. 12 is a schematic view for explaining an example of a configuration of a four-line CCD sensor applicable to the image reading apparatus shown in FIG. 11.

FIG. 12 schematically showing the four-line CCD sensor applicable to the image reading apparatus shown in FIG. 11. As shown in FIG. 12, four lines sensors of a Red (R) line sensor 109-1, a Green (G) line sensor 109-2, a Blue (B) line sensor 109-3, and a Black (bk) line sensor 109-4 are integrally formed in the four-line CCD sensor 109. Accordingly, four signals of R, G, B, and Bk are simultaneously output from the CCD sensor 109. When the document is scanned in the sub-scan direction using the four-line CCD sensor 109, the signals are output in the order of Black (bk), Red (R), Green (G), and Blue (B).

Figure 13:
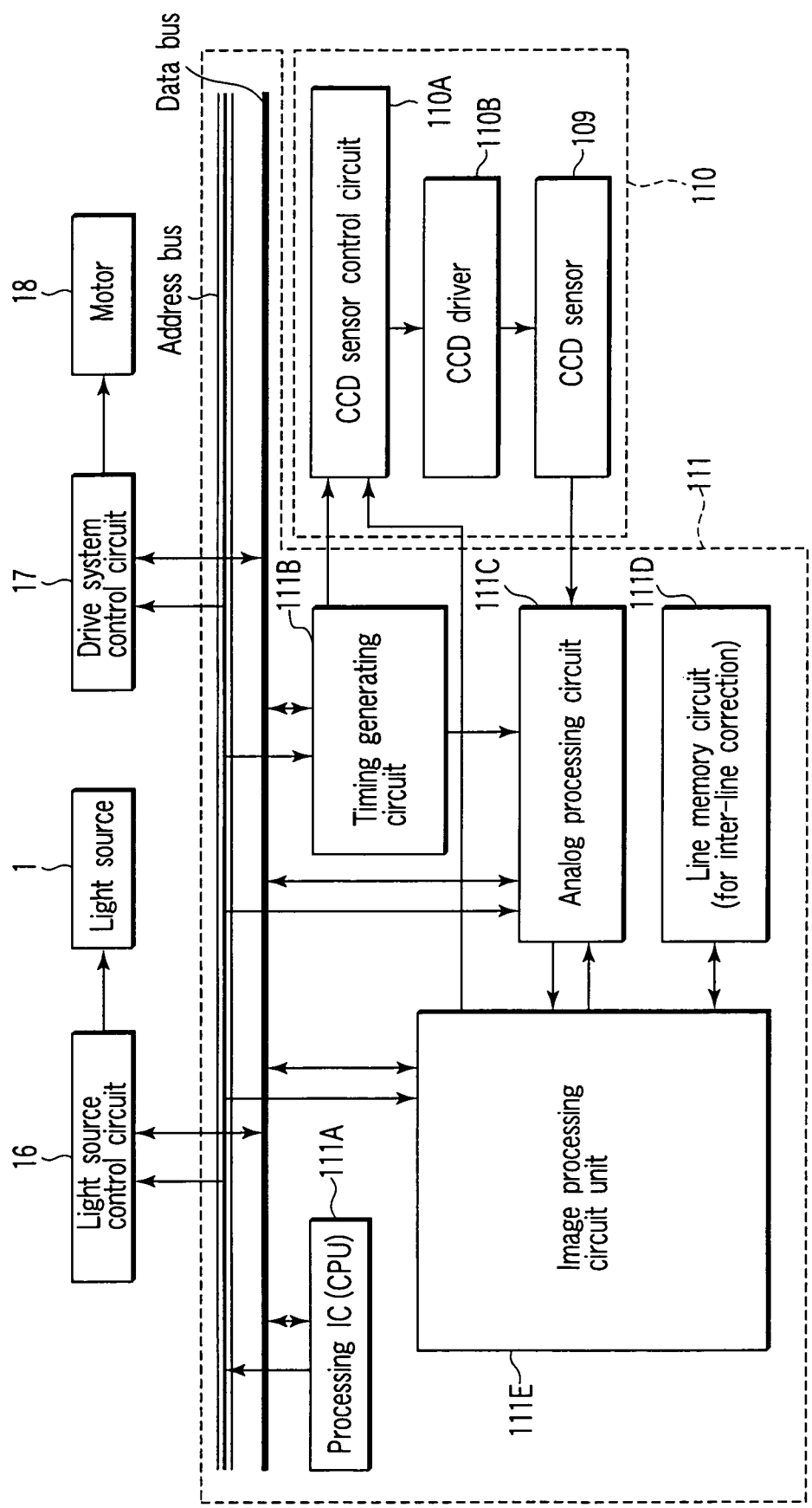
FIG. 13 is a block diagram for explaining an example of an image processing device incorporated into the image reading apparatus shown in FIG. 11.

FIG. 13 shows an example of a configuration of the signal processing board of FIG. 11. In FIG. 13, the same constituent as for FIG. 2 is indicated by the same reference numeral, and the description is not be repeated here.

The signal processing board (signal processing unit) shown in FIG. 13 is substantially equal to the signal processing board (control board, i.e., signal processing unit) 11 shown in FIG. 2 in the configuration. However, the signal processing board shown in FIG. 13 is modified so as to be able to be compatible with the four-line CCD sensor 109 respectively.

In the CCD sensor board 110 on which the four-line CCD sensor 109 is mounted, a CCD sensor control circuit 110A and a CCD driver 110B are formed so as to be compatible with the four-line CCD sensor 109 respectively.

In the signal processing board 111, a timing generation circuit 111B, an analog processing circuit 111C, a line memory circuit 111D, and an image processing circuit unit 111E are formed so as to be able to process the four-line CCD sensor 109 respectively.

Figure 14:
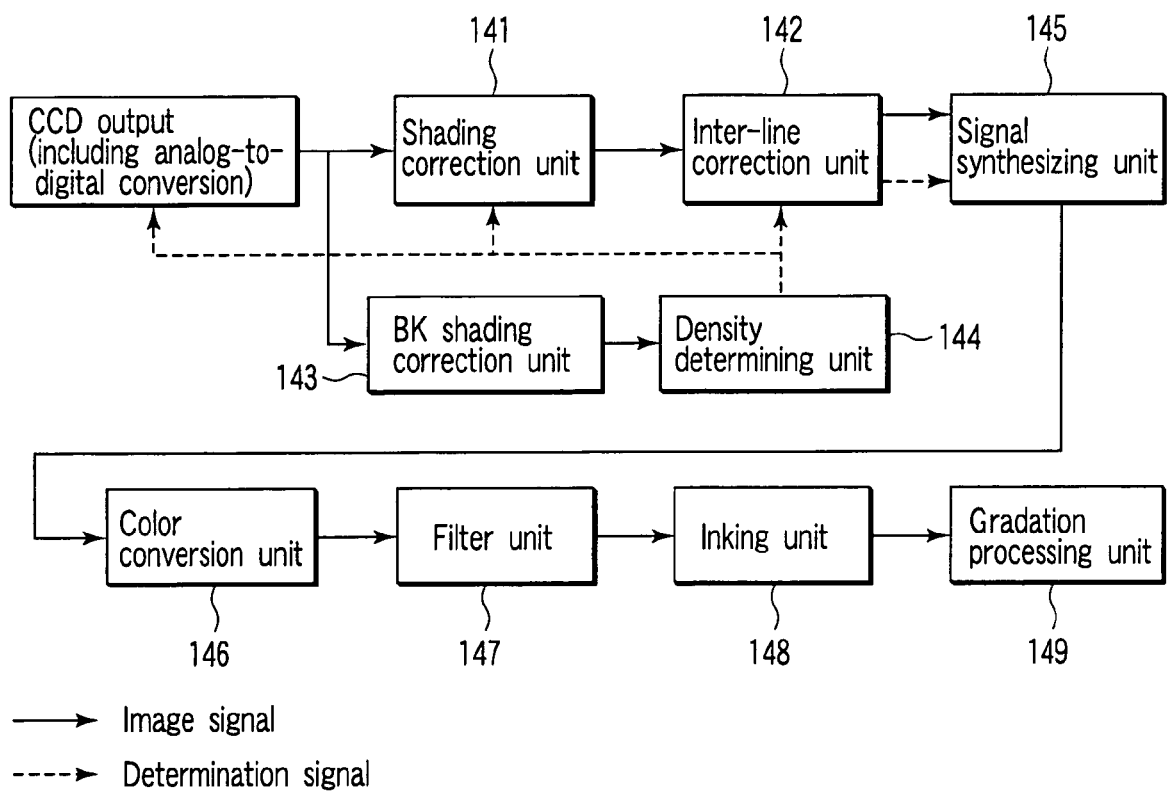
FIG. 14 is a block diagram for explaining an example of an image processing unit applicable to the image processing device shown in FIG. 13.

FIG. 14 shows a configuration of the image processing circuit unit 111E.

The image processing circuit unit 111E includes a shading correction unit 141, an inter-line correction unit 142, a bk shading correction unit 143, an image density determining unit 144, a signal synthesizing unit 145, the color conversion unit 46, the filter unit 47, the inking unit 48, and the gradation processing unit 49. The color conversion unit 46, the filter unit 47, and the gradation processing unit 49 substantially have the same configurations as for the three-line CCD sensor 9 in the image processing circuit unit 11E shown in FIG. 2.

The shading correction unit 141 corrects the high-sensitivity and low-sensitivity distortions which are included in the digital signal output from the analog processing circuit 111C (shading correction is performed).

In the image signal to which the shading correction is performed, the inter-line correction unit 142 corrects the physical position shift of the output signal corresponding to each of R, G, and B (the inter-line correction unit 142 performs the physical position shift correction, i.e., "inter-line correction" to the output from each line sensor (R, G, and B)).

The bk shading correction unit 143 is operated in conjunction with the image density determining unit 144. The bk shading correction unit 143 determines whether each piece of the image data has the high density or not by comparing each piece of the image data to a particular threshold. For example, the bk shading correction unit 143 outputs a determination signal having one bit (0: low density, 1: high density).

The determination signal from the image density determining unit 144 (bk shading correction unit 143) is input to the inter-line correction unit 142 to align with the R, G, and B signals.

Thus, the sensitivity in each pixel of each line of the CCD sensor 109 can be switched by generating the determination signal to switch the sensitivity in each pixel (light-reception cell of CCD sensor) based on the determination signal.

The signal synthesizing unit 45 synthesizes the low-sensitivity characteristics signal and the high-sensitivity characteristics signal. In the signal synthesizing unit 45, the conversion is performed by the method for compressing range on the low-density side using the one-dimensional conversion table shown in FIGS. 5A and 5B.

The color conversion unit 46 converts the output signals (R, G, and B signals) whose sensitivity is set in each pixel synthesized by the signal synthesizing unit 45 into the C, M, and Y signals (the color conversion unit 46 performs the color conversion of the R, G, and B signals into the C, M, and Y signals).

As described in FIG. 4, the signals to which the color conversion into the C, M, and Y signals are performed by the color conversion unit 46 are input to the filter unit 47, and the predetermined filtering is performed to the signals. Then, the C, M, and Y signals are converted into C, M, Y, and K (bk, i.e., black) signals by the inking unit 48.

The signals output from the inking unit 48 are input to the gradation processing unit 49. The screen is generated by, e.g., the dither method, and the screen is output to an image forming unit (engine; not shown).

FIG. 15 is a flowchart showing an image processing flow performed by the image reading apparatus shown in FIG. 11 and the image processing unit shown in FIG. 14.

When the scan start signal is received (S101), the reference value is computed (S102). Reference value computation <15-2> for computing the white reference value/black reference value necessary for the shading correction is performed.

Namely, when the scan start signal <15-1> is supplied in Step S101, the white reference and black reference values are computed based on the light reflected from the white reference plate 12 in Step S102. At this point, the gain switching signal is output as the low-sensitivity characteristics setting value during reading the white reference plate 12. The white reference data during the high-sensitivity reading is produced by the read white reference data.

The ratio of the high sensitivity to the low sensitivity is set at, e.g., 2, and the white reference data for the high sensitivity is computed by the following equation:

High-sensitivity white reference data=2×low-sensitivity white reference data

This procedure is similar to Steps S1 and S2 shown in FIG. 6.

The reference computation is performed in each line sensor, i.e., the Red (R) line sensor 109-1, the Green (G) line sensor 109-2, the Blue (B) line sensor 109-3, and the Black (bk) line sensor 109-4 (separately). The switching between the low sensitivity and the high sensitivity are required only for the R, G, and B line sensors, so that the high-sensitivity reference data is not computed for the bk line sensor 109-4.

After the shading reference data is computed in Step S102, a real scan action <15-3> is performed to the document image (S103). (At the time when the shading reference data is computed in Step S102, the lamp (the light source) 1 is turned on at a predetermined timing, and the document image is scanned (read) by moving both the first carriage 4 and the second carriage 7 in the direction of the arrow S along the document glass 13.)

The shading correction is performed to the document data read in Step S103 using the white reference data/black reference data for the bk line sensor 109-4 in bk shading correction <15-4> (S104).

Density is determined by density determination processing to the monochrome output image to which the bk shading correction is performed in Step S104 in density determination process <15-5>. Then, the monochrome output image is provided to shading correction <15-6> as the determination signal used to switch the gain in each pixel in the main scan direction of each line sensor of the CCD sensor 109 (S105).

Specifically, the determination is performed to the image data (DATA) read with the bk line sensor by the following conditions: The determining method is similar to the method described above referring to FIG. 7. DATA is the output value from the pixel column independently arranged in line.

Condition 11: if DATA<th_H, high sensitivity determination ("1" is output), and

Condition 12: if DATA≧th_H, low sensitivity determination ("0" is output), where, th_H is threshold compared to the image data (th_H=21 in this case), and th_H is determined based on sensitivity characteristics of the line sensor corresponding to R, G and B respectively.

Thus, as already shown in FIG. 7, the signal for switching the output gain of the line sensors corresponding to R, G, and B can be obtained in one pixel unit.

Then, the shading correction is performed in the shading correction process <15-6> (S106). The shading correction process <15-6>, the inter-line correction <15-7> (S107) subsequent to the shading correction process <15-6>, and signal synthesizing <15-8> (S108) are similar to the Steps S7 to S9 shown in FIG. 6, so that the detail descriptions are not be repeated here. Further, the conversion of the R, G, and B signals into the C, M, and Y signals by the color conversion unit 46, the filtering by the filter unit 47, the conversion of the C, M, and Y signals into the C, M, Y, and K (bk, i.e., black) signals by the inking unit 48, and the gradation process by the gradation processing unit 49 are also are similar to the Steps <6-7>, <6-8> and <6-9> shown in FIG. 6, so that the detail descriptions are also not be repeated here.

As described above, in the image reading apparatus shown in FIG. 11 and the image processing unit shown in FIG. 14, the density determination is performed by using the Bk line sensor 109-4 in the four-line CCD sensor 109. The Bk line sensor 109-4 can output the image information prior to the R line sensor 109-1, the G line sensor 109-2, and the B line sensor 109-3. Therefore, when compared with the image reading apparatus shown in FIG. 1 and the three-line CCD sensor described referring to FIG. 4, the pre-scan action can be not be repeated here. Accordingly, the sensitivity of each of the R, G, and B sensors can be switched immediately after the density of the document is detected, so that performance (image processing speed) can be improved and storage capacity of the memory can be reduced. Further the good image quality with no gradation skip can be obtained.

In the above-described embodiment, the sensitivity ratio of the low sensitivity to the high sensitivity is set at an integer (n). However, it is also possible that the sensitivity ratio is set at a real number (the sensitivity ratio is not always set at an integer).

In the above-described embodiment, the gradation reproducibility of the dark portion is improved. However, it is also possible that the reproducibility of the light portion is improved.

As described above, according to the image processing device and the image forming apparatus of the invention, unlike the prior art in which the light-reception surface of CCD has the different sensitivity characteristics, the signals having the different sensitivity characteristics can be output by generating the switching signal for switching the sensitivity characteristics of the CCD sensor based on the image signal during the pre-scan. Therefore, the image with no gradation skip can be realized at low cost, and cost reduction can be achieved in the image reading apparatus and the image processing device.

Since the shading correction is performed to each of the outputs of the different sensitivity characteristics, the signal of each of the sensitivity characteristics can be corrected, the good image can be obtained.

Further, since the white reference data is computed based on the data of the sensitivity characteristics from one side, the time required for the shading correction can be shortened, and the performance can be improved.

Further, the RGB-sensor sensitivity switching signal is generated based on the image data which is previously read by the bk sensor, so that the RGB-sensor sensitivity can be switched without performing the pre-scan, and the performance can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising steps of:
generating image signals using a photoelectric conversion element which has pixel columns of at least three lines;
detecting an amplitude of the image signal;
switching a gain of the photoelectric conversion element based on the amplitude; and
performing shading correction based on a formula A upon the gain being a first gain and based on a formula B upon the gain being a second gain,
wherein the formula A is:
DLout=(DLin −black reference value)/(white reference value for low sensitivity−black reference value), where DLin is the amplitude of the image signal and DLout is a result of the shading correction; and
wherein the formula B is:
DHout=(DHin−black reference value)/(white reference value for high sensitivity−black reference value), where DHin is the amplitude of the image signal and DHout is a result of the shading correction.

2. An image processing method according to claim 1, wherein the gain is set to the first gain upon the amplitude being higher than a threshold, the gain is set to the second gain upon the amplitude being lower than the threshold, and the first gain is less than the second gain.

* * * * *